(12) United States Patent
Narita

(10) Patent No.: US 12,461,698 B2
(45) Date of Patent: Nov. 4, 2025

(54) COMPUTER-READABLE STORAGE MEDIUM, INFORMATION PROCESSING DEVICE, AND METHOD FOR PRINTING COMPOSITE IMAGE

(71) Applicant: BROTHER KOGYO KABUSHIKI KAISHA, Nagoya (JP)

(72) Inventor: Kenju Narita, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/350,070

(22) Filed: Jul. 11, 2023

(65) Prior Publication Data
US 2023/0350617 A1     Nov. 2, 2023

Related U.S. Application Data

(63) Continuation of application No. PCT/JP2022/001536, filed on Jan. 18, 2022.

(30) Foreign Application Priority Data

Jan. 26, 2021 (JP) ................. 2021-010571

(51) Int. Cl.
*G06F 3/12* (2006.01)

(52) U.S. Cl.
CPC .......... *G06F 3/1256* (2013.01); *G06F 3/1208* (2013.01); *G06F 3/1242* (2013.01); *G06F 3/1293* (2013.01)

(58) Field of Classification Search
CPC .... G06F 3/1256; G06F 3/1208; G06F 3/1242; G06F 3/1293; G06F 3/12; G06F 3/1228; G06F 3/1204; G06F 3/1225; B41J 5/30
See application file for complete search history.

(56) References Cited

U.S. PATENT DOCUMENTS 8,553,260 B2 *   10/2013   Goldwater ............ G06F 3/1256
                                                          358/1.9
11,301,190 B2 *   4/2022   Kakitsuba ............. G06F 3/1259
                          (Continued)

FOREIGN PATENT DOCUMENTS

JP    2008152668 A    7/2008
JP    2009076049 A    4/2009
(Continued)

OTHER PUBLICATIONS

English Machine Translation of JP 2019179039 A (Kakitsuba, filed on Sep. 30, 2019). (Year: 2019).*

(Continued)

*Primary Examiner* — Juan M Guillermety
(74) *Attorney, Agent, or Firm* — Scully, Scott, Murphy & Presser, PC

(57) ABSTRACT

A non-transitory computer-readable storage medium stores computer-readable instructions that are executable by a computer of an information processing device and conform to a printer connected with the information processing device. The instructions cause, when executed by the computer, the information processing device to obtain, from an external device connected with the information processing device, an image for composition that is registered in the external device, and to cause, in response to a print instruction with a print setting for the printer to print a composite image being output from an application program to a general-purpose print program, a user interface of the information processing device to display the composite image in which a target image to be printed according to the print instruction is combined with the obtained image for composition, before performing a printing process to cause the printer to print the composite image displayed on the user interface.

15 Claims, 11 Drawing Sheets

(56) References Cited

U.S. PATENT DOCUMENTS

| | | | |
|---|---|---|---|
| 11,720,306 B2* | 8/2023 | Yamada | G06F 3/1256 358/1.15 |
| 2003/0139973 A1* | 7/2003 | Claremont | G06Q 30/06 705/26.81 |
| 2005/0248811 A1* | 11/2005 | Nakagiri | G06F 3/1208 358/1.18 |
| 2009/0059278 A1 | 3/2009 | Fukunishi | |
| 2009/0073476 A1* | 3/2009 | Torikoshi | G06F 3/1256 358/1.18 |
| 2013/0063742 A1* | 3/2013 | Kikuchi | G06F 3/1228 358/1.11 |
| 2014/0320919 A1* | 10/2014 | Kowaka | H04N 1/0044 358/1.15 |
| 2015/0103367 A1* | 4/2015 | Tsujita | G06F 3/1256 358/1.13 |
| 2020/0110559 A1 | 4/2020 | Natori | |
| 2020/0249882 A1 | 8/2020 | Yamada | |
| 2020/0252519 A1* | 8/2020 | Kunimatsu | G06F 3/1244 |
| 2020/0310708 A1* | 10/2020 | Hosomizo | G06F 3/1228 |
| 2020/0310717 A1 | 10/2020 | Yamada | |
| 2021/0117135 A1 | 4/2021 | Suzuki | |
| 2021/0232350 A1* | 7/2021 | Kakitsuba | G06F 3/1242 |
| 2023/0350613 A1* | 11/2023 | Narita | G06F 3/1205 |

FOREIGN PATENT DOCUMENTS

| | | |
|---|---|---|
| JP | 2011193097 A | 9/2011 |
| JP | 2015049580 A | 3/2015 |
| JP | 2020004254 A | 1/2020 |
| JP | 2020060849 A | 4/2020 |
| JP | 2020126370 A | 8/2020 |
| JP | 2020166350 A | 10/2020 |
| JP | 2020166433 A | 10/2020 |

OTHER PUBLICATIONS

International Preliminary Report on Patentability and Written Opinion from PCT/JP2022/001536 dated Jul. 31, 2023 together with English language translations.

International Search Report dated Apr. 19, 2022 issued in PCT/JP2022/001536.

English-language translation of Japanese Office Action dated Aug. 6, 2024 received in a corresponding foreign application, namely Japanese Patent Application No. 2021-010571, 7 pages.

Notice of Reasons for Refusal dated Nov. 26, 2024 received from the Japanese Patent Office, 8 Pages.

* cited by examiner

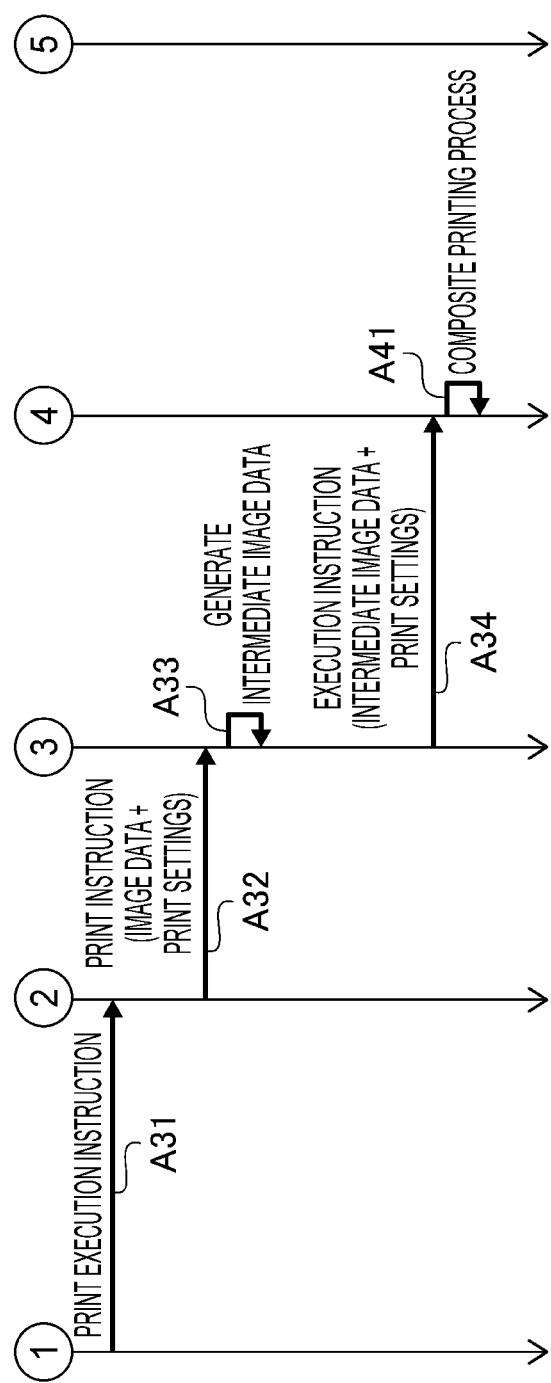

COMPUTER-READABLE STORAGE MEDIUM, INFORMATION PROCESSING DEVICE, AND METHOD FOR PRINTING COMPOSITE IMAGE

REFERENCE TO RELATED APPLICATIONS

This application is a continuation of PCT International Application No. PCT/JP2022/001536 filed on Jan. 18, 2022, and claims priority from Japanese Patent Application No. 2021-010571 filed on Jan. 26, 2021, which is incorporated herein by reference in its entirety.

BACKGROUND ART

As a technology to control a printer from an information processing device such as a personal computer, a configuration has been known in which the information processing device generates print data by a printer driver, and displays a preview image of the generated print data before sending the print data to the printer. Further, as a technology for the printer driver, a technology to generate a composite image in which an image for composition (e.g., a watermark or a stamp) is combined with a target image to be printed has been known.

DESCRIPTION

In recent years, a technology has been put to practical use in which a printer is controlled by a print program that is incorporated as standard into an operating system (hereinafter referred to as an "OS") of an information processing device, without using a printer driver as described above. In this technology, the OS associates the printer with the OS-standard print program, and thereafter, the information processing device is enabled to cause the printer to perform printing with the OS-standard print program without using a printer driver in response to receiving a print instruction to the printer.

However, the OS-standard general-purpose printing program described above does not have a function to generate a composite image using the image for composition. Therefore, the information processing device is unable to display a preview image related to the composite image, and is further unable to cause the printer to print the composite image.

Aspects of the present disclosure are advantageous for providing one or more improved techniques for an information processing device, into which an OS-standard general-purpose print program is incorporated, to cause a printer to print a composite image.

According to aspects of the present disclosure, a non-transitory computer-readable storage medium is provided, which stores computer-readable instructions that are executable by a computer of an information processing device and conform to a printer connected with the information processing device. The instructions are configured to, when executed by the computer, cause the information processing device to obtain, from an external device connected with the information processing device, an image for composition that is registered in the external device. The instructions are configured to, when executed by the computer, cause the information processing device to, in response to a print instruction with a print setting for the printer to print a composite image being output from an application program incorporated in the information processing device to a general-purpose print program incorporated in advance in an operating system of the information processing device, cause a user interface of the information processing device to display the composite image in which a target image to be printed according to the print instruction is combined with the obtained image for composition, before performing a printing process to cause the printer to print the composite image displayed on the user interface.

According to aspects of the present disclosure, further provided is an information processing device that includes a user interface and a controller. The controller includes a processor and a non-transitory computer-readable storage medium. The non-transitory computer-readable storage medium stores an application program, a general-purpose print program, and computer-readable instructions. The general-purpose print program is incorporated in advance in an operating system of the information processing device. The computer-readable instructions conform to a printer connected with the information processing device. The instructions are configured to, when executed by the processor, cause the controller to obtain, from an external device connected with the information processing device, an image for composition that is registered in the external device. The instructions are further configured to, when executed by the processor, cause the controller to, in response to a print instruction with a print setting for the printer to print a composite image being output from the application program to the general-purpose print program, cause the user interface to display the composite image in which a target image to be printed according to the print instruction is combined with the obtained image for composition, before performing a printing process to cause the printer to print the composite image displayed on the user interface.

According to aspects of the present disclosure, further provided is a method implementable by a processor executing computer-readable instructions on an information processing device. The instructions conform to a printer connected with the information processing device. The method includes obtaining, from an external device connected with the information processing device, an image for composition that is registered in the external device. The method further includes causing, in response to a print instruction with a print setting for the printer to print a composite image being output from an application program incorporated in the information processing device to a general-purpose print program incorporated in advance in an operating system of the information processing device, the user interface to display the composite image in which a target image to be printed according to the print instruction is combined with the obtained image for composition, before performing a printing process to cause the printer to print the composite image displayed on the user interface.

FIGS. 2A and 2B are sequence charts showing an example procedure of printing operations by individual programs.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

A detailed explanation will be provided below of a personal computer (hereinafter referred to as a "PC") using a support program in an illustrative embodiment according to aspects of the present disclosure, with reference to the accompanying drawings. In the present disclosure, a support program executable by the PC connected with a printer having a printing function is described.

Figure 1:
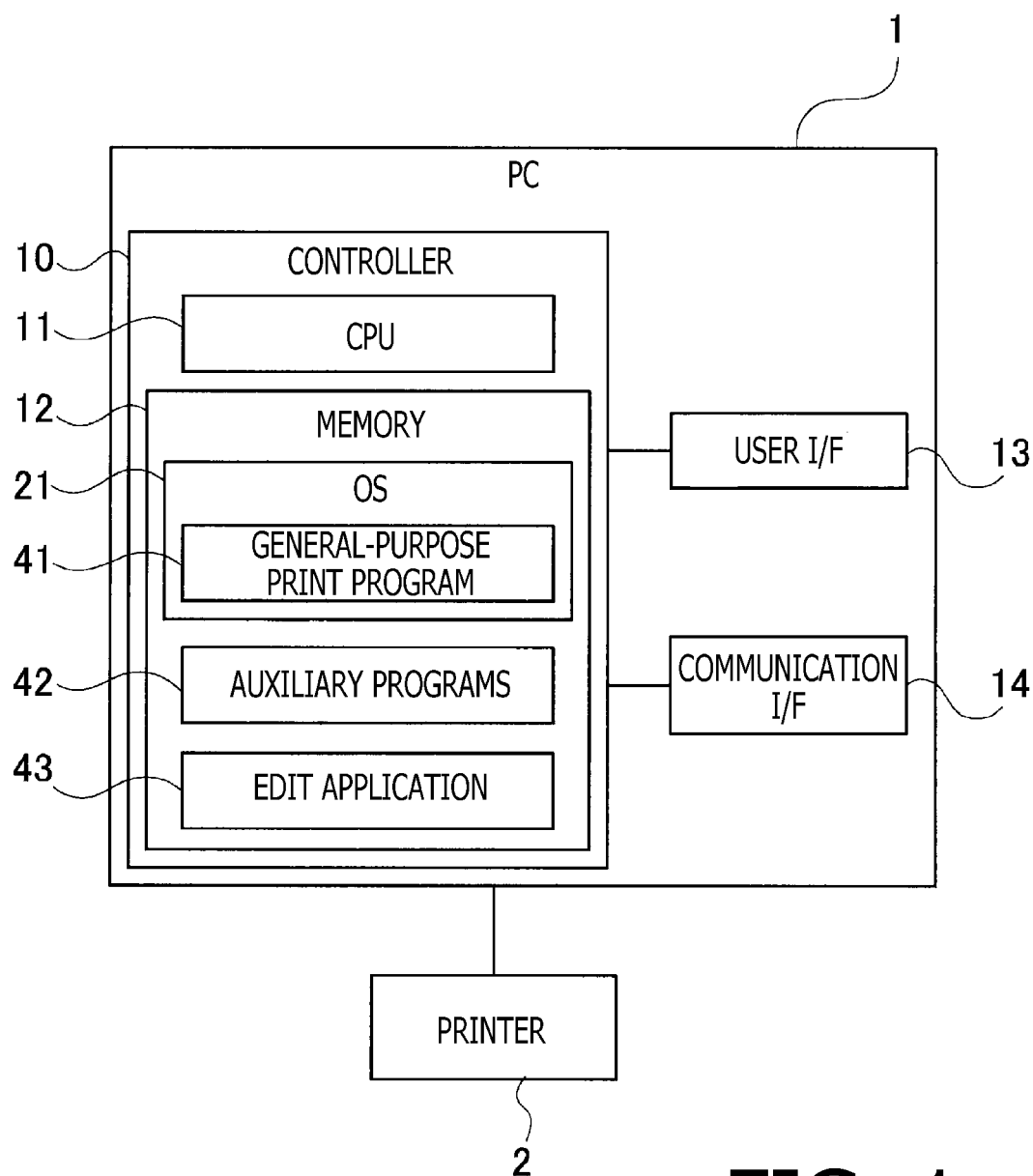
FIG. 1 is a block diagram schematically showing an electrical configuration of a PC.

As shown in FIG. 1, a PC 1 of the illustrative embodiment has a controller 10 that includes a CPU 11 and a memory 12. The PC 1 may be an example of an "information processing device" according to aspects of the present disclosure. The CPU 11 may be an example of a "processor" according to aspects of the present disclosure. The PC 1 further includes a user interface (hereinafter referred to as a "user I/F") 13 and a communication interface (hereinafter referred to as a "communication I/F") 14, which are electrically connected with the controller 10. The controller 10 shown in FIG. 1 is a collective term for hardware and software used to control the PC 1, and may not necessarily represent a single hardware element actually existing in the PC 1.

The CPU 11 is configured to perform various processes according to programs read from the memory 12 and based on user operations. The memory 12 stores various types of data and various programs including various application programs (hereinafter, which may be referred to as "applications"). The memory 12 is also used as a work area when various processes are performed. A buffer provided to the CPU 11 may be an example of a "memory" according to aspects of the present disclosure. Examples of the memory 12 are not limited to ROMs, RAMs, or HDDs, but may include storage media (e.g., CD-ROMs and DVD-ROMs) that are readable and writable by the CPU 11.

The user I/F 13 includes hardware configured to display screens to provide information to the user, and hardware configured to receive user operations. The user I/F 13 may have a combination of a display configured to display information, and a mouse and a keyboard that are configured to receive user input operations. The user I/F 13 may include a touch panel configured to display information and receive user input operations.

The communication I/F 14 includes hardware configured to communicate with external devices such as a printer 2. Communication standards applicable for the communication I/F 14 include Ethernet ("Ethernet" is a registered trademark of Fuji Xerox Co., Ltd.), Wi-Fi ("Wi-Fi" is a registered trademark of the non-profit Wi-Fi Alliance), and USB. The PC 1 may have a plurality of communication I/Fs 14 conforming to a plurality of communication standards.

As shown in FIG. 1, the memory 12 of the PC 1 stores an operating system (hereinafter referred to as an "OS") 21 including a general-purpose print program 41, and further stores auxiliary programs 42 and an edit application 43. The auxiliary programs 42 may be included in examples of a "support program" according to aspects of the present disclosure. The edit application 43 may be an example of an "application program" according to aspects of the present disclosure. Examples of the OS 21 may include Windows ("Windows" is a registered trademark of Microsoft Corporation), macOS ("macOS" is a registered trademark of Apple Inc.), Linux ("Linux" is a registered trademark of Linus Torvalds), iOS ("iOS" is a registered trademark of Cisco Systems, Inc.), and Android ("Android" is a registered trademark of Google LLC).

The general-purpose print program 41 is an OS-standard program for causing various types of printers (e.g., the printer 2) to perform printing based on user instructions. The general-purpose print program 41 in the illustrative embodiment is a program having a function to generate intermediate image data based on image data to be printed. For instance, the intermediate image data is XPS data.

The general-purpose print program 41 supports functions that are usable in common by a plurality of models of printers provided by a vendor of the various types of printers. The general-purpose print program 41 does not support all of the specific functions of the various types of printers. Functions supportable by the general-purpose print program 41 are limited to generic functions.

The auxiliary programs 42 include one program or a group of programs configured to, when executed by the CPU 11, cause the PC 1 to perform processing based on instructions from the OS 21, accompanying processing by the general-purpose print program 41. The auxiliary programs 42 include one or more applications that support control of a target hardware element. The auxiliary programs 42 in the illustrative embodiment conform to a model of the printer 2 connected with the PC 1. The auxiliary programs 42 are launched from the general-purpose print program 41, for instance, when the PC 1 has received an instruction to cause the printer 2 to perform printing using the general-purpose print program 41. For instance, the auxiliary programs 42 may be referred to as hardware support applications (abbreviation: HSAs).

The auxiliary programs 42 are configured to, when executed by the CPU 11, cause the PC 1 to accept a plurality of types of instructions from the general-purpose print program 41 and perform various types of processes based on the accepted instructions. The auxiliary programs 42 may include a combination of a plurality of programs each of which is configured to, when executed by the CPU 11, cause the PC 1 to accept execution instructions. The auxiliary programs 42 may include one program configured to, when executed by the CPU 11, cause the PC 1 to accept instructions and perform respective different processes according to the accepted instructions.

The auxiliary programs 42 may include a program prepared for each type of printer by the vendor of the various types of printers. For instance, the auxiliary programs 42 may include an auxiliary program prepared for inkjet printers and an auxiliary program prepared for laser printers. For instance, when a new printer is connected with the PC 1, the OS 21 causes the PC 1 to download an appropriate auxiliary program from a server or another source depending on a type of the connected printer and to incorporate the downloaded auxiliary program into the PC 1. The OS 21 then causes the PC 1 to store identification information of the incorporated auxiliary program in the memory 12 in association with printer information of the newly connected printer. It is noted that the auxiliary programs 42 may include not only the auxiliary program prepared for each type of printer but also an auxiliary program prepared for each model of printer or an auxiliary program prepared for each series of models of printers.

The edit application 43 is, for instance, an application for creating and editing image data and document data. For instance, the edit application 43 may be Microsoft Word or Microsoft PowerPoint, or may be an application provided by the vendor of the printer 2. "Microsoft" is a registered trademark of Microsoft Corporation. "PowerPoint" is a registered trademark of Microsoft Corporation. The edit application 43 is configured to accept user operations that include instructions to cause the printer 2 to perform particular operations. Specifically, for instance, the edit application 43 is configured to, when executed by the CPU 11, cause the PC 1 to accept, via the user I/F 13, a print execution instruction to cause the printer 2 to perform printing.

The printer 2 in the illustrative embodiment is a device having a printing function. The PC 1 is communicably connected with the printer 2 via the communication I/F 14. The printer 2 is configured to receive print data, for instance, from the PC 1 and perform printing based on the received print data.

Figure 2A:
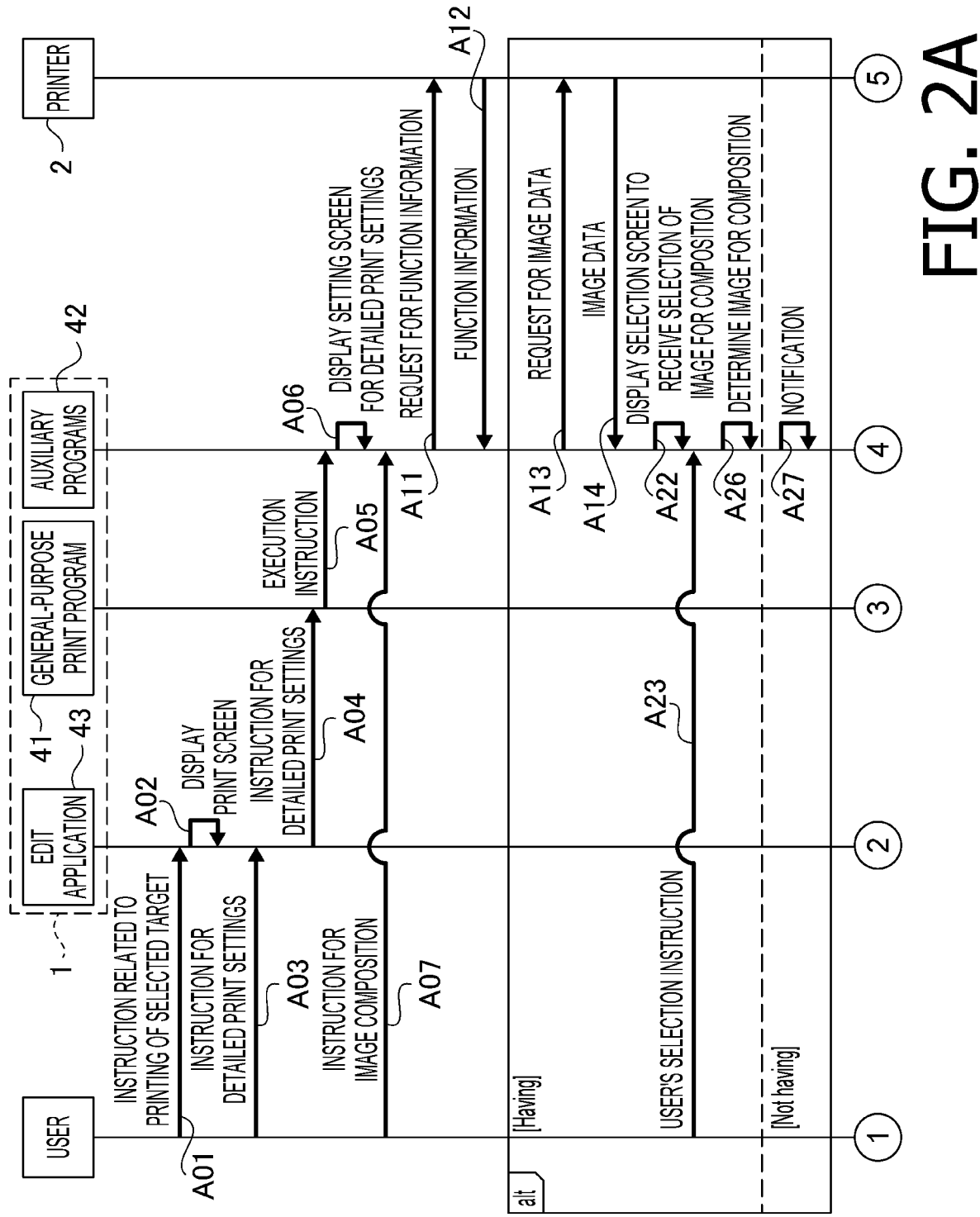

Next, a printing procedure including operations by the auxiliary programs 42 of the illustrative embodiment will be described with reference to sequence charts in FIGS. 2A and 2B. FIGS. 2A and 2B show operations when the PC 1, with the auxiliary programs 42 conforming to the printer 2 incorporated therein, has received a print execution instruction to cause the printer 2 to perform printing using the general-purpose print program 41, with an application (e.g., the edit application 43) to receive a print instruction.

Each processing step in the processes and flowchart(s) in the illustrative embodiment basically indicates processing by the CPU 11 according to instructions described in programs such as the auxiliary programs 42. Processing by the CPU 11 also includes hardware control using an API of the OS 21. In the present disclosure, operations by each program may be described without a detailed explanation of the OS 21. In addition, "obtaining" and "acquiring" may be used as concepts that do not necessarily require a request.

The edit application 43 is configured to accept creating and editing of text, charts, figures, and other information based on user's instructions. In response to receiving an instruction related to printing of currently selected target (e.g., text, a chart, or a figure) (A01), the edit application 43 causes the user I/F 13 to display a print screen for receiving user instructions (A02). For instance, the edit application 43 receives, via the print screen, a print execution instruction, an instruction for basic print settings, and an instruction to start accepting detailed print settings.

When the edit application 43 has received an instruction to start accepting detailed print settings while the printer 2 is selected on the print screen being displayed (A03), the edit application 43 passes information on the received instruction to start accepting detailed print settings to the OS 21. When the OS 21 has received the information on the instruction to start accepting detailed print settings for printing using the general-purpose print program 41, the OS 21 activates the general-purpose print program 41 and provides the instruction to start accepting detailed print settings to the general-purpose print program 41 (A04). In response to receiving the instruction to start accepting detailed print settings, the general-purpose print program 41 provides an execution instruction to accept detailed print settings to the auxiliary programs 42 conforming to the printer 2 as currently selected (A05).

The auxiliary programs 42 start operating based on the execution instruction from the general-purpose print program 41, and cause the user I/F 13 to display a setting screen to receive input operations for detailed print settings (A06). For instance, based on model information on the model of the printer 2, the auxiliary programs 42 cause the user I/F 13 to display a setting screen to receive detailed print settings conformable to the model of the printer 2, and accepts user operations.

Figure 3:
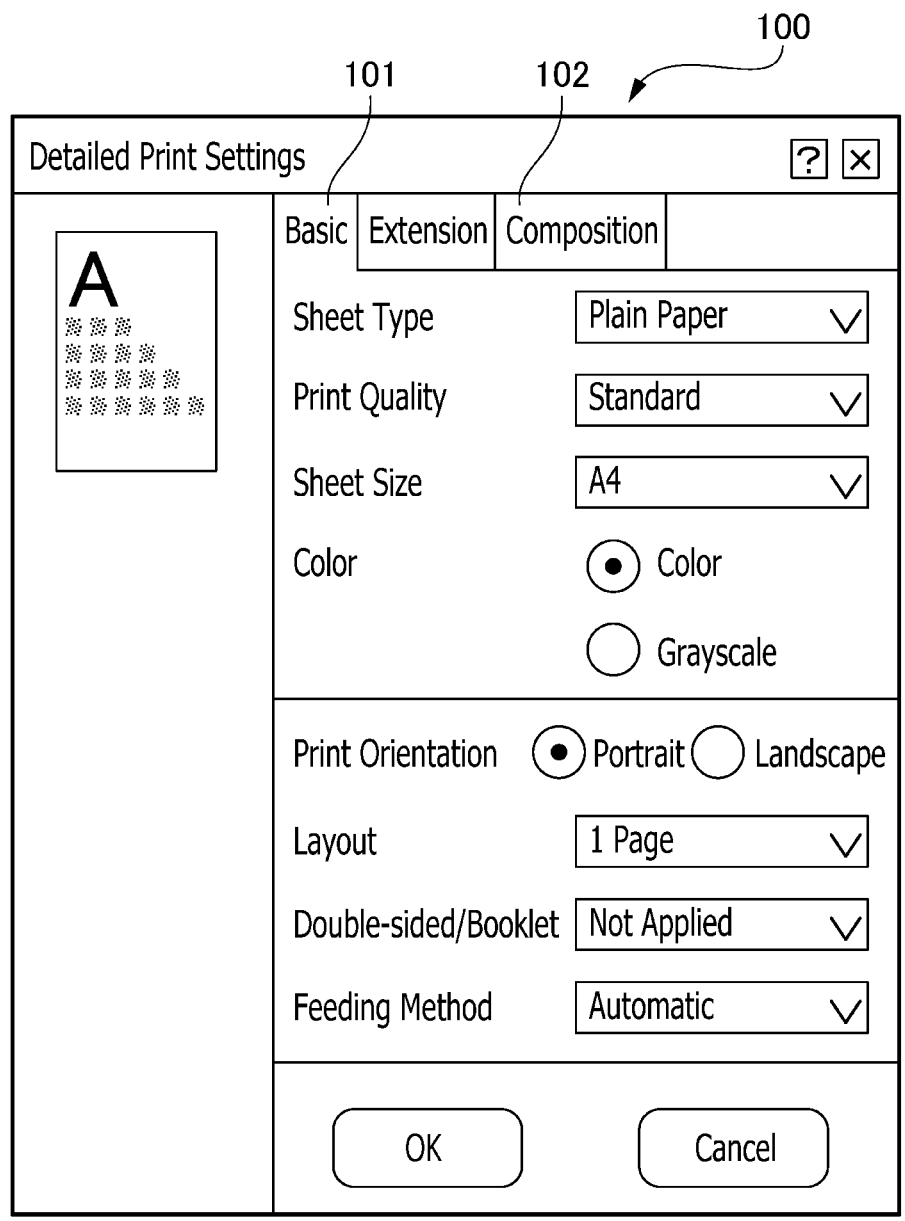
FIG. 3 shows an example of a setting screen.

FIG. 3 shows an example of the setting screen. A setting screen 100 shown in FIG. 3 has a plurality of tabs. The setting screen 100 shown in FIG. 3 is an example screen on which a basic tab 101 for accepting basic print settings is selected. The settings screen 100 has a composition tab 102 for receiving an instruction for image composition to combine an image such as a watermark with a target image to be printed. The instruction for image composition may be accepted not only by operating the composition tab 102 but also by operating an operable member such as a button.

When having received an instruction for image composition in response to an operation to the composite tab 102 on the setting screen 100 displayed in A06 (A07), the auxiliary programs 42 send a request for function information to the printer 2 via the communication I/F 14 (A11) and receive the function information from the printer 2 (A12). The function information includes information indicating whether the printer 2 has a sending function to send image data.

The printer 2 in the illustrative embodiment accepts registration of an image for composition, which is to be combined with a print target image and printed, in response to an instruction from the PC 1 or through reading from a USB memory. The printer 2 stores the accepted image in a memory of the printer 2. For instance, the printer 2 stores a plurality of types of image data representing images for watermarks. The printer 2 having the sending function is enabled to send image data indicating images for composition stored in the memory of the printer 2 in response to a request from an external device such as the PC 1. The image data that the PC 1 obtains from the printer 2 is, for instance, intermediate image data of the images for composition.

When having determined that the printer 2 has the sending function to send image data in response to an external request, based on the function information received in A12 (alt: [Having]), the auxiliary programs 42 send a request for image data to the printer 2 (A13) and receive the image data from the printer 2 (A14). The auxiliary programs 42 then store the received image data in the memory 12. In this case, the printer 2 may be an example of an "external device" according to aspects of the present disclosure. If the printer 2 stores a plurality of pieces of image data, the auxiliary programs 42 may obtain the plurality of pieces of image data.

When the image data is obtained while the setting screen 100 for accepting detailed print settings is being displayed, it is possible to complete processing after receipt of a print instruction earlier than when the image data is obtained at the timing when the print instruction has been received. Moreover, for instance, when the PC 1 is connected with a plurality of printers, the PC 1 may obtain image data registered in a printer that the PC 1 is to cause to perform printing, thereby managing images for composition that are suitable for each printer.

The communication between the auxiliary programs 42 and the printer 2 may be performed, for instance, by the auxiliary programs 42 directly communicating with the printer 2 using the MIB ("MIB" is an abbreviation for "Management Information Base") or through the OS 21. When the communication between the auxiliary programs 42 and the printer 2 may be performed via the OS 21, the auxiliary programs 42 and the printer 2 communicate with each other, for instance, according to a communication protocol for the OS 21, such as IPP ("IPP" is an abbreviation for "Internet Printing Protocol").

Figure 4:
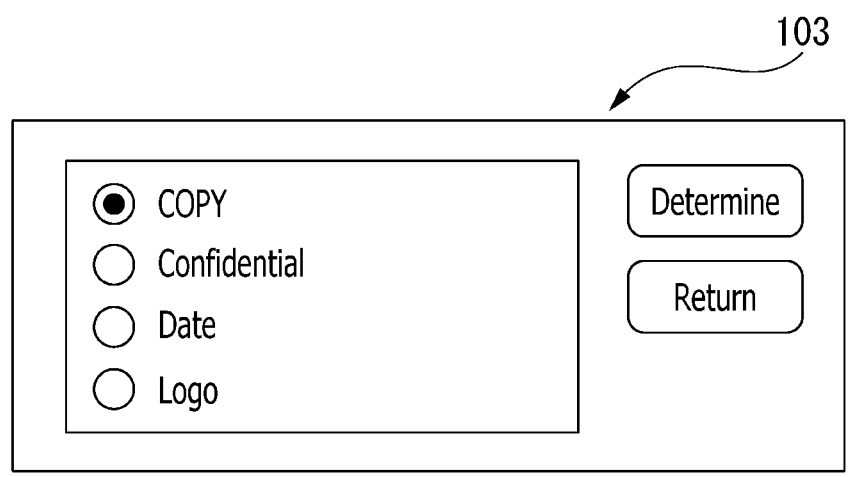
FIG. 4 shows an example of a selection screen.

The auxiliary programs 42 then display a selection screen to receive selection of an image for composition via the user I/F 13 (A22). For instance, as shown in FIG. 4, the auxiliary programs 42 display, on the selection screen, a list 103 of names of the images for composition obtained from the printer 2, and receive a user's selection instruction (A23). The auxiliary programs 42 may display respective images representing the individual images for composition on the selection screen for receiving the selection of an image for composition. Thus, the user is allowed to select an image for composition from among the plurality of images for composition, thereby increasing the degree of freedom for selecting an image for composition and improve the user friendliness. The auxiliary programs 42 then determine the image selected by the user as an image for composition to be combined with a target image to be printed (A26). The auxiliary programs 42 may execute A11 to A14 before receiving the instruction for image composition in A07.

On the other hand, when having determined that the printer 2 does not have the sending function to send image data in response to an external request, based on the function information received in A12 (alt: [Not having]), the auxiliary programs 42 cause the user I/F 13 to display a message to provide a notification that the PC 1 is unable to obtain the image data of the images for composition (A27).

When the printer 2 does not have the sending function to send image data in response to an external request, the auxiliary programs 42 are unable to display a preview image of the composite image. In this case, the auxiliary programs 42 may omit processes to obtain the images for composition and to display the preview image of the composite image even when having received an instruction for image composition, thereby reducing the processing load on the auxiliary programs 42. In addition, since the notification that the PC 1 is unable to obtain the image data of the images for composition is provided, the user is allowed to be aware of that. Even in cases where the auxiliary programs 42 are unable to obtain the image data as a response to the request for the image data in A13, such as when no image data is registered in the printer 2, the auxiliary programs 42 may provide substantially the same notification as in A27.

After determining the image for composition in A26 or after providing the notification in A27, for instance, the auxiliary programs 42 return to the display of the basic tab 101 shown in FIG. 3. In response to receiving an instruction to terminate configuration of the detailed print settings via the setting screen 100, the auxiliary programs 42 terminate the display of the setting screen 100 and provide a termination notification to the general-purpose print program 41. In response to receiving the termination notification from the auxiliary programs 42, the general-purpose print program 41 passes the termination notification to the edit application 43.

In response to receiving a print execution instruction from the user via the print screen (A31), the editing application 43 provide a print instruction to the general-purpose print program 41 (A32). The general-purpose print program 41 obtains information indicating image data of the target image to be printed and information indicating the print settings in the print instruction.

The general-purpose print program 41 generates intermediate image data by converting a format of the image data included in the received print instruction to a format of intermediate image data (A33), and generates a print job including the intermediate image data. The edit application 43 includes various types of image data. The general-purpose print program 41 converts the received image data into intermediate image data suitable for generating print data. If the image data included in the print instruction is suitable for generating print data, the image data may be used as is as the intermediate image data without being converted.

The general-purpose print program 41 further provides an execution instruction to the auxiliary programs 42 (A34), and activates the auxiliary programs 42. Through the execution instruction, the generated intermediate image data and information on the print settings are passed to the auxiliary programs 42. Namely, the auxiliary programs 42 obtains the intermediate image data from the OS 21 in A34.

When the auxiliary programs 42 have received an instruction for image composition as a print setting, the information on the print settings passed to the auxiliary programs 42 together with the intermediate image data includes information specifying an image for composition as information related to image composition. When the auxiliary programs 42 determine the image for composition in A26, information on the determined image for composition may be stored in the memory 12 and used as part of the print settings. In the following description, a case in which the print settings include an instruction for image composition will be explained.

Figure 5A:
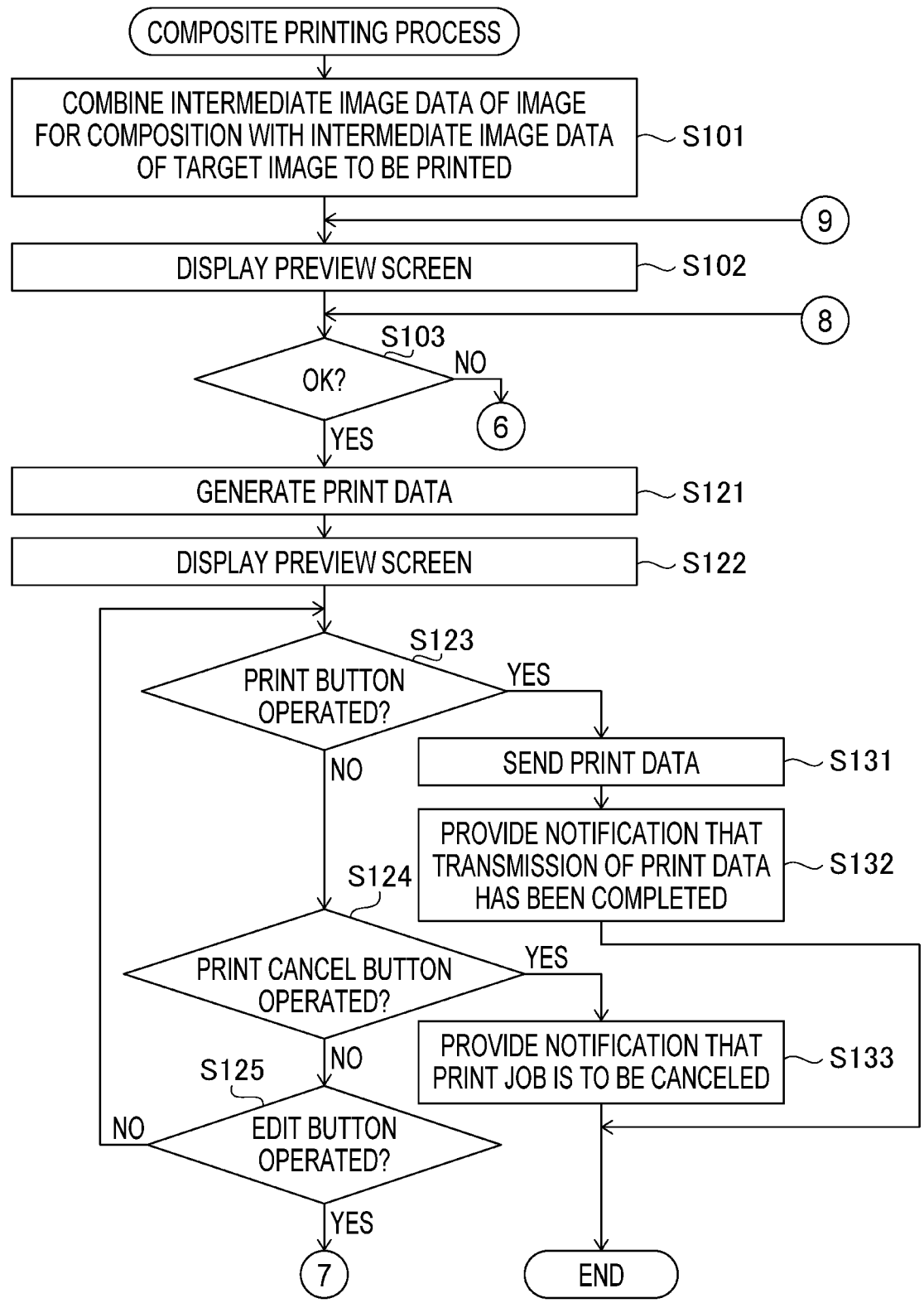
FIGS. 5A and 5B are flowcharts showing a procedure of a composite printing process.
Figure 5B:
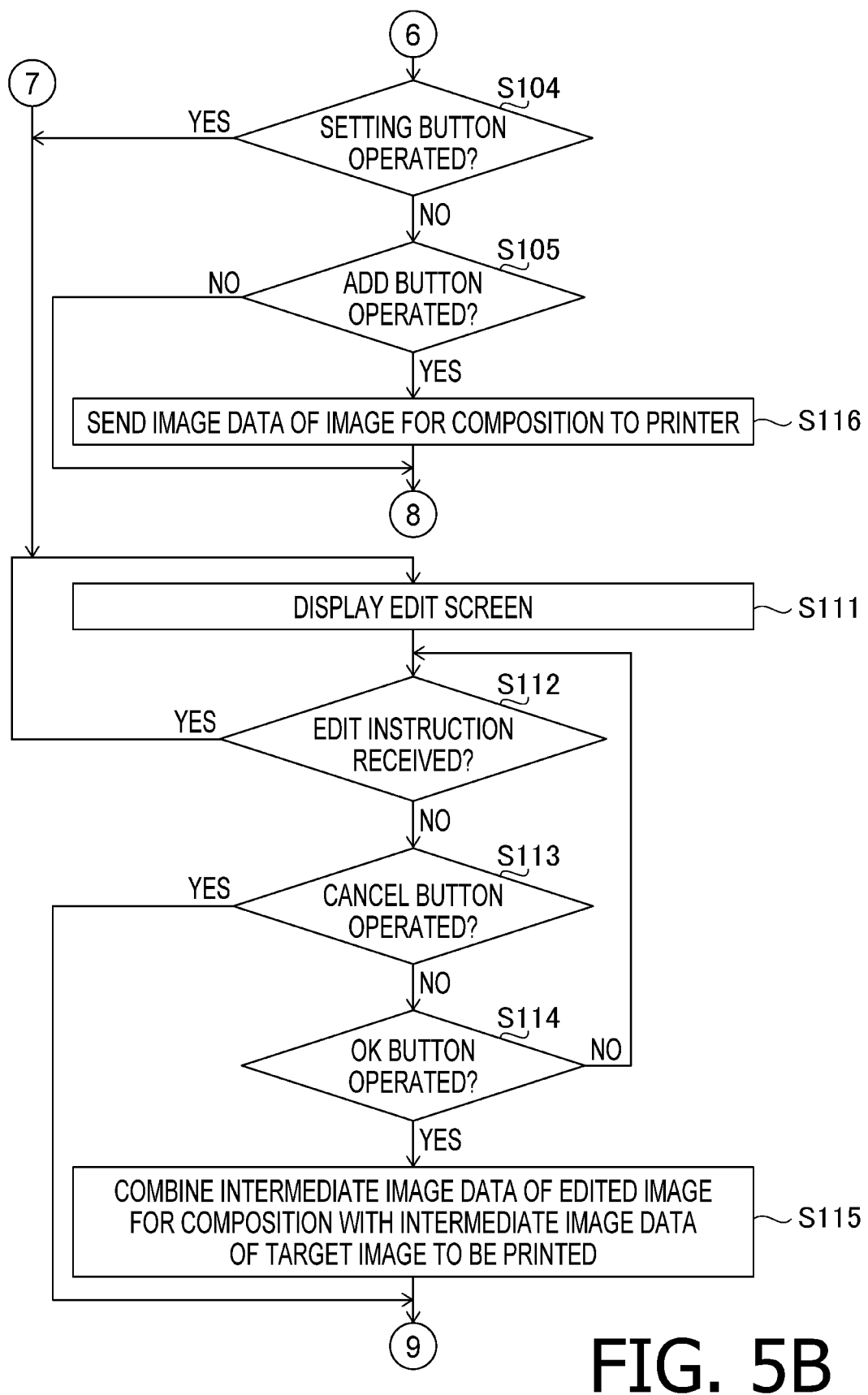

The auxiliary programs 42 performs a composite printing process based on an instruction for image composition being included in the print settings of the received execution instruction (A41). The composite printing process is a process to perform image composition based on the instruction for image composition and generate print data of an image resulting from the image composition. A procedure of the composite printing process is described with reference to FIGS. 5A and 5B. The composite printing process is performed by the CPU 11 of the PC1 with the auxiliary programs 42.

In the composite printing process, first, according to an execution instruction received from the general-purpose print program 41, the CPU 11 combines the intermediate image data of the target image to be printed that has been received from the general-purpose print program 41, with the intermediate image data of the image for composition that corresponds to the information specifying the image for composition and has been read from the memory 12, thereby generating intermediate image data of the image after the image composition (S101). The intermediate image data generated in S101 may be an example of an "intermediate composite image" according to aspects of the present disclosure. Thus, when the target image to be printed and the image for composition are combined with each other in the state of intermediate image data, the composite image is generated more easily than when the target image to be printed and the image for composition are combined with each other after rasterization.

Figure 6:
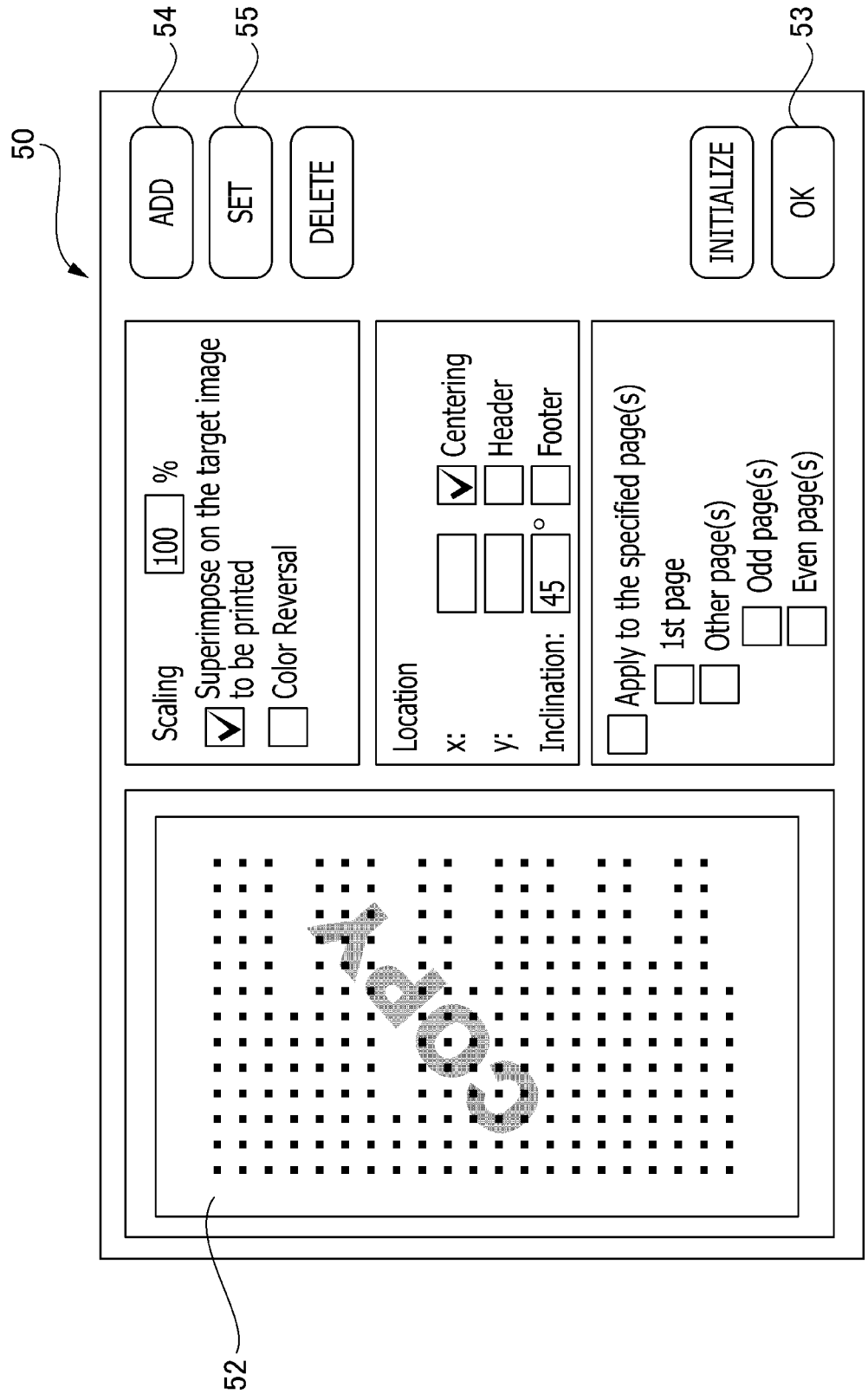
FIG. 6 shows an example of a preview screen.

The CPU 11 then causes the user I/F 13 to display a preview screen including a preview image of the image after the image composition (S102). FIG. 6 shows an example of the preview screen. The preview screen 50 shown in FIG. 6 includes a preview image 52, an OK button 53, an add button 54, and a setting button 55. The preview image 52 is a sample image schematically representing the composite image obtained by combining the image for composition with the target image to be printed.

The CPU 11 determines whether the OK button 53 has been operated on the preview screen 50 being displayed (S103). In response to determining that the OK button 53 has not been operated (S103: No), the CPU 11 determines whether the setting button 55 has been operated (S104). In response to determining that the setting button 55 has not been operated (S104: No), the CPU 11 determines whether the add button 54 has been operated (S105). When having determined that the add button 54 has not been operated (S105: No), the CPU 11 waits until one of the OK button 53, the add button 54, and the setting button 55 is operated.

Figure 7:
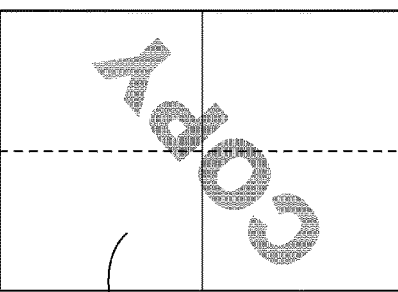
FIG. 7 shows an example of an edit screen.

In response to determining that the setting button 55 has been operated (S104: Yes), the CPU 11 causes the user I/F 13 to display an edit screen configured to accept editing of the image for composition (S111). FIG. 7 shows an example of the edit screen. The edit screen 60 shown in FIG. 7 includes a sample image 61 of the image for composition, a basic item field 62 for receiving instructions to change settings (e.g., a display content and a font) for the image for composition, an OK button 63, and a cancel button 64.

The CPU 11 determines whether an edit instruction has been received, for instance, in response to an operation to the basic item field 62 on the edit screen 60 being displayed (S112). This allows the user to edit the image for composition on the edit screen 60, thereby increasing the degree of freedom for the composite image and improving the user-friendliness. The auxiliary programs 42 accept designations of settings for editing the image for composition, such as an inclination, transparency, a superposition order, a location, a size, an image (text) content, and a page designation. In response to determining that an edit instruction has been received (S112: Yes), the CPU 11 returns to S111 and causes the user I/F 13 to display the edit screen 60 including a sample image of the edited image.

In response to determining that an edit instruction has not been received (S112: No), the CPU 11 determines whether the cancel button 64 has been operated (S113). In response to determining that the cancel button 64 has been operated (S113: Yes), the CPU 11 returns to S102 and causes the user I/F 13 to display the preview screen 50. In response to determining that the cancel button 64 has not been operated (S113: No), the CPU 11 determines whether the OK button 63 has been operated (S114). In response to determining that the OK button 63 has not been operated (S114: No), the CPU 11 waits until the PC 1 receives either an edit instruction, an operation to the OK button 63, or an operation to the cancel button 64.

In response to determining that the OK button 63 has been operated (S114: Yes), the CPU 11 combines the intermediate image data of the edited image, that is, the image being displayed as the sample image 61 of the image for composition, with the intermediate image data of the target image to be printed (S115). Then, the CPU 11 returns to S102 and causes the user IN 13 to display the preview screen 50 including a preview image of the image after the image composition.

On the other hand, in response to determining that the add button 54 has been operated on the preview screen 50 being displayed (S105: Yes), the CPU 11 sends to the printer 2 the image data of the image being displayed as the sample image 61 of the image for composition and a registration command for instructing the printer 2 to register the image data in the memory of the printer 2 (S116). The CPU 11 may enable the acceptance of an operation to the add button 54 in response to acceptance of the editing of the image.

Thereby, the printer 2 stores the received image data in the memory of the printer 2 as the image for composition. By registering the edited image in the printer 2, it is possible to use the edited image as the image for composition in the next printing or printing from another PC. The printer 2 may overwrite the image data of the image for composition before editing, or may newly store the image data of the edited image with a name assigned. In S116, the CPU 11 may receive a user instruction as to whether to overwrite the image data of the image before editing or newly register the image data of the edited image, and include information based on the user instruction in the registration command.

In response to determining that the OK button 53 has been operated on the preview screen 50 being displayed (S103: Yes), the CPU 11 rasterizes the intermediate image data of the image after the image composition and generates print data (S121). The print data generated in S121 may be an example of a "raster image" and an example of a "raster composite image" according to aspects of the present disclosure. The print data generated in S121 is data in a format usable for printing by the printer 2, for instance, PDL data dedicated to the model of the printer 2.

When the rasterization is performed by the auxiliary programs 42 conforming to the printer 2, a higher degree of freedom is achieved, and print data suitable for printing by the printer 2 is more likely to be generated, than when the rasterization is performed by the general-purpose print program 41. The print data generated by the auxiliary programs 42 may be in a format usable for printing by printers other than the model of the printer 2.

Instead of the auxiliary programs 42 generating the print data, the general-purpose print program 41 may generate the print data. Namely, the auxiliary programs 42 may pass the intermediate image data of the image after the image composition and information on the execution of printing to the general-purpose print program 41. The general-purpose print program 41 may rasterize the intermediate image data received from the auxiliary programs 42 to generate print data, and may pass the generated print data to the auxiliary programs 42.

The print data generated by the general-purpose print program 41 is print data in a format usable for printing by various types of printers, such as PWG-Raster data or PDF data. When the rasterization is performed by the general-purpose print program 41, the auxiliary programs 42 are responsible for less processing. Therefore, in this case, it is possible to avoid an increase in processing time and to reduce the program size of the auxiliary programs 42.

Figure 8:
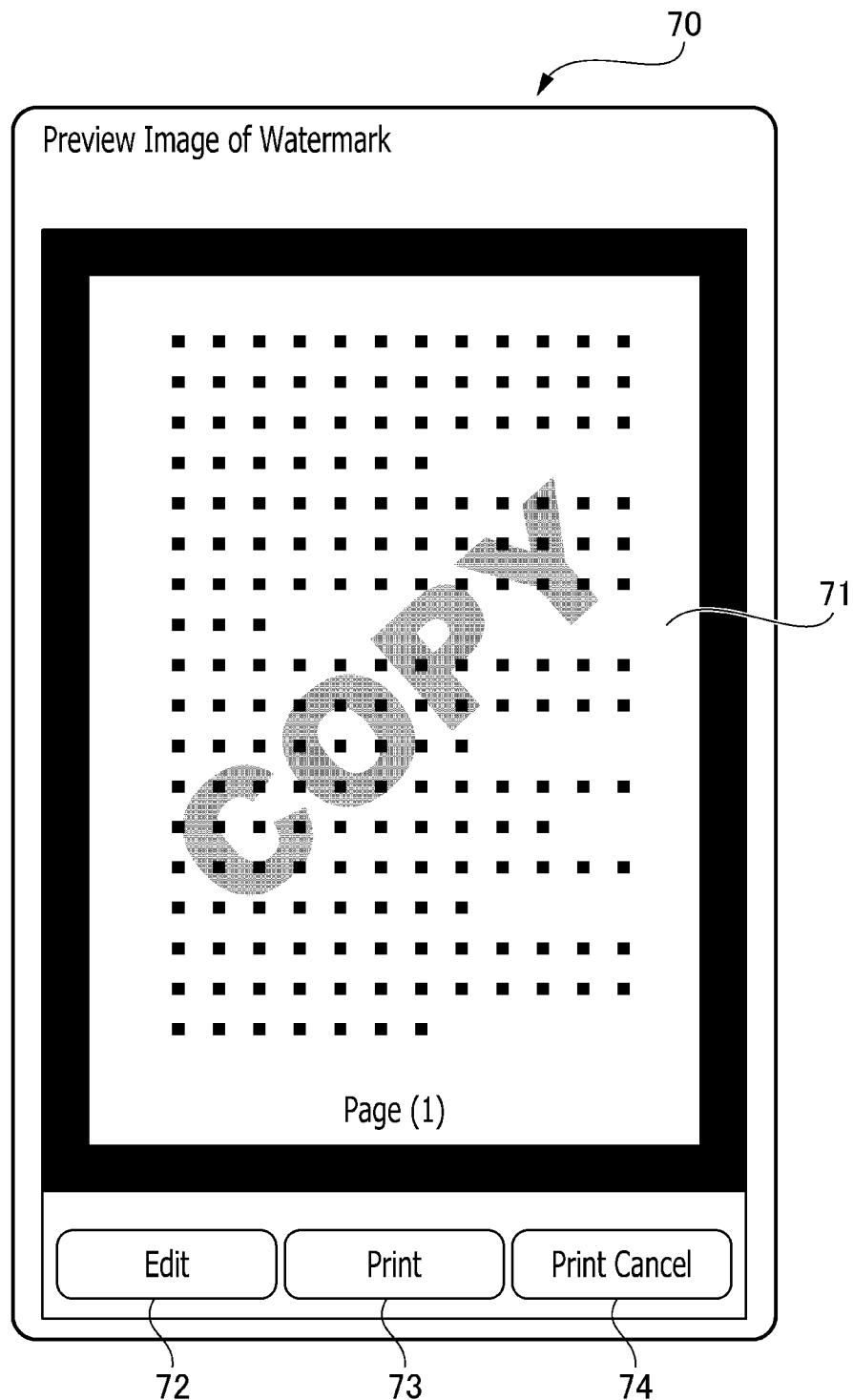
FIG. 8 shows an example of a preview screen.

The CPU 11 causes the user I/F 13 to display a preview screen based on the generated print data (S122). FIG. 8 shows an example of the preview screen displayed in S122. The preview screen 70 shown in FIG. 8 includes a preview image 71, an edit button 72, a print button 73, and a print cancel button 74. The preview image 71 represents the composite image obtained by combining the image for composition with the target image to be printed.

Then, the CPU 11 determines whether an operation to the print button 73 has been received on the preview screen 70 being displayed (S123). In response to determining that the operation to the print button 73 has not been received (S123: No), the CPU 11 determines whether an operation to the print cancel button 74 has been received (S124). In response to determining that an operation to the print cancel button 74 has not been received (S124: No), the CPU 11 determines whether an operation to the edit button 72 has been received (S125). In response to determining that an operation to the edit button 72 has not been received (S125: No), the CPU 11 waits until an operation to one of the buttons (i.e., the print button 73, the print cancel button 74, and the edit button 72) is received.

In response to determining that an operation to the edit button 72 has been received (S125: Yes), the CPU 11 proceeds to S111. In S111, the CPU 11 causes the user I/F 13 to display the edit screen 60 as shown in FIG. 7, and accepts user's edit instructions.

In response to determining that an operation to the print button 73 has been received (S123: Yes), the CPU 11 sends to the printer 2 the print data generated in S121 together with a print command for instructing the printer 2 to perform printing (S131).

After sending the print data, the CPU 11 provides a notification that the transmission of the print data has been completed to the general-purpose print program 41 (S132). With this, the general-purpose print program 41 terminates the process concerning the print job based on the print command received in A32 of FIG. 2. The printer 2, which has received the print data and the print command, performs printing of the image represented by the print data, based on the received print command. As a result, a printed material is generated.

The transmission of the print data to the printer 2 may be performed by the general-purpose print program 41. Specifically, for instance, the auxiliary programs 42 may pass the generated print data to the general-purpose print program 41 in such a manner that the print data is to be transmitted from the PC 1 with the printer 2 as the transmission destination. The general-purpose print program 41 may send to the printer 2 the print data received from the auxiliary programs 42.

On the other hand, in response to determining that an operation to the print cancel button 74 has been received on the preview screen 70 being displayed (S124: Yes), the CPU 11 provides a notification that the print job is to be canceled to the general-purpose print program 41 (S133). Thereby, the general-purpose print program 41 cancels the print job that is based on the print instruction received in A32 of FIG. 2 and terminates the printing process. After S132 or S133, the CPU 11 terminates the composite printing process.

The printer 2 in the illustrative embodiment may have a composite function to perform image composition. The printer 2 having the composite function performs image composition and printing in response to receiving a composite print command to instruct the printer 2 to perform composite printing. The composite print command includes, for instance, print data representing a target image to be printed and a designation command to specify an image for composition. When having received the composite print command, the printer 2 reads image data of the image for composition specified by the designation command from a memory of the printer 2, combines the read image data with the received print data, and prints the image after the image composition.

If the printer 2 has the composite function, the auxiliary programs 42 may generate the print data of the target image to be printed, instead of generating the print data of the image after image composition. In this case, the auxiliary programs 42 may further send to the printer 2 a composite print command including the generated print data and a designation command to specify the image for composition.

In addition, the printer 2 may have a rasterizing function to rasterize the intermediate image data. If the printer 2 has the rasterizing function, the auxiliary programs 42 may send to the printer 2 a composite print command that includes the intermediate image data of the target image to be printed and a designation command to specify the image for composition, without generating the print data of the target image to be printed.

When the auxiliary programs 42 do not perform image composition but send the composite print command to the printer 2, and the printer 2 generates a composite image and prints the generated composite image, the load on the auxiliary programs 42 is reduced. On the other hand, when the auxiliary programs 42 generate a composite image and sends the generated composite image to the printer 2, the printer 2 does not need to perform image composition, and the load on the printer 2 is reduced.

Based on whether a printer selected as a device that is caused to perform printing has the composite function to perform image composition, the auxiliary programs 42 may determine whether to cause the printer or cause the auxiliary programs 42 to perform image composition. For instance, the auxiliary programs 42 may send to the printer 2 a request for information indicating whether the printer 2 has the composite function to perform image composition, in A11 of FIG. 2. If the printer that is caused to perform printing does not have the composite function to perform image composition, the auxiliary programs 42 may not accept an instruction for image composition as a print setting.

As described in detail above, according to the auxiliary programs 42 in the illustrative embodiment, the PC 1 obtains an image for composition that the printer 2 has, generates a composite image by combining the obtained image for composition with a target image to be printed, and displays a preview image of the generated composite image. Thus, the user is allowed to know in advance what image will be printed by the printer 2, thereby increasing the possibility of avoiding printing unintended by the user.

Furthermore, in the illustrative embodiment, the images for composition are managed on the printer 2. Therefore, the images for composition are usable by other PCs and devices connected with the printer 2. Accordingly, the images for composition are usable in common by a plurality of PCs.

While aspects of the present disclosure have been described in conjunction with various example structures outlined above and illustrated in the drawings, various alternatives, modifications, variations, improvements, and/or substantial equivalents, whether known or that may be presently unforeseen, may become apparent to those having at least ordinary skill in the art. Accordingly, the example embodiment(s), as set forth above, are intended to be illustrative of the technical concepts according to aspects of the present disclosure, and not limiting the technical concepts. Various changes may be made without departing from the spirit and scope of the technical concepts according to aspects of the present disclosure. Therefore, the disclosure is intended to embrace all known or later developed alternatives, modifications, variations, improvements, and/or substantial equivalents. Some specific examples of potential alternatives, modifications, or variations according to aspects of the present disclosure are provided below.

Examples of the device connected with the PC 1 are not limited to a printer, but may include devices and apparatuses having the printing function, such as multi-function peripherals, copiers, and fax machines. The number of printers connected with the PC 1 is not limited to the example shown in the drawings, but may be two or more.

Figure 9:
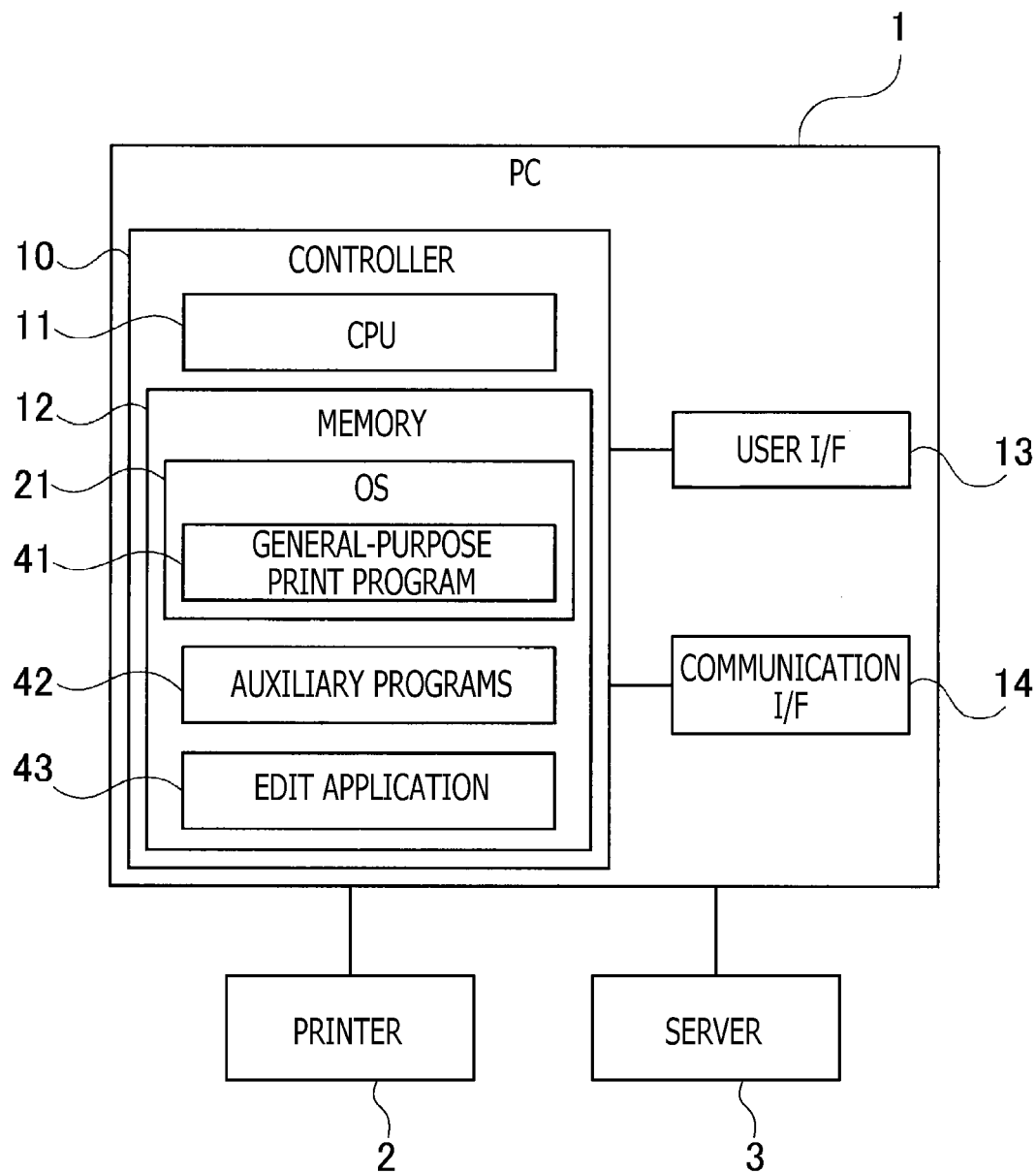
FIG. 9 is a block diagram schematically showing an electrical configuration of a PC.

Examples of the external device are not limited to the printer 2, but may include servers and other devices that are communicably connected with the PC 1. For instance, as shown in FIG. 9, aspects of the present disclosure may be applied to a configuration in which the printer 2 and a server 3 are connected with the PC 1, and the server 3 has the images for composition. In this configuration, the auxiliary programs 42 may send substantially the same requests as in A11 and A13 (see FIG. 2A) to the server 3. In addition, the auxiliary programs 42 may send substantially the same instruction for registration as in S116 of the composite printing process (see FIGS. 5A and 5B) to the server 3. The server 3 may perform substantially the same processes in A12 and A14 and register image data of, e.g., an edited image for composition in a memory of the server 3 in response to the requests from the PC 1. The auxiliary programs 42 may perform substantially the same processes as in A22 and subsequent steps based on the image data obtained from the server 3, and may accept a user's selection of an image for composition. When the images for composition are managed on the server, the capacity of the memory of the printer may be smaller. Meanwhile, when the images for composition are managed on the printer, the images for composition are usable even in a smaller printing system without a server.

The display screens shown in the drawings are all examples, and practicable examples thereof are not limited to the ones shown. For instance, with respect to the images and the buttons displayed on the individual display screens, practicable examples of the respective locations and the counts thereof are not limited to the examples shown in the drawings. For instance, it is assumed that the edit screen 60 shown in FIG. 7 is configured to display thereon the sample image 61 of the image for composition. However, the edit screen 60 may be configured to not display the sample image 61 of the image for composition. Further, it is assumed that the preview screen 50 shown in FIG. 6 is configured to accept a change in the location of the image for composition. However, the preview screen 50 may be configured to not accept a change in the location of the image for composition.

In the aforementioned illustrative embodiment, the preview screen is displayed in both of the steps S102 and S122 in the composite printing process. However, the preview screen may be displayed in only one of the steps S102 and S122. For instance, S122 to S125 and S133 may be deleted. In this case, when the OK button 53 is operated on the preview screen 50, the CPU 11 may send the print data generated in S121 to the printer 2. Further, for instance, S102 may be deleted. In this case, the CPU 11 may cause the user I/F 13 to display a preview screen after generating the print data of the composite image obtained after image composition. In that case, instead of performing image composition with intermediate image data, the CPU 11 may perform image composition after rasterizing each of the target image to be printed and the image for composition. Thus, when the image composition is performed with the rasterized images, the composite image is sent to the printer more quickly than when the image composition is performed with the intermediate image data.

The image data that the auxiliary programs 42 obtain from the printer 2 in A14 of FIG. 2 may not be intermediate image data, but may be, for instance, image data in a format directly combinable with print data. In this case, the accuracy for displaying the sample image 52 is enhanced. The auxiliary programs 42 may generate the print data in S121 of the composite printing process (see FIGS. 5A and 5B), then combine the image data of the image for composition with the generated print data, and display a preview image based on the print data after the image composition in S122.

In the aforementioned illustrative embodiment, the auxiliary programs 42 collectively obtain all image data stored in the printer 2 in A14 of FIG. 2. However, practicable examples of the auxiliary programs 42 are not limited to the example described in the aforementioned illustrative embodiment. For instance, the auxiliary programs 42 may obtain only names or thumbnail information of selectable images for composition in A14, and may obtain, in response to receiving a user's selection of an image, image data of the selected image.

Furthermore, in A11 or A13 of FIG. 2A, the auxiliary programs 42 may make a request for not only the function information or the image data but also, for instance, information about the capability of the printer 2. In that case, the printer 2 may send various types of information in response to the requests. The auxiliary programs 42 may display a screen for receiving user settings based on the various types of information obtained from the printer 2.

In the illustrative embodiment, only the printing operation has been described in detail as an operation by the auxiliary programs 42. However, the auxiliary programs 42 may have other additional roles. The programs for executing the processes in the illustrative embodiment are not limited to the auxiliary programs 42, but may be any programs configured to accept instructions from the OS 21 or the general-purpose print program 41 when printing is performed using the general-purpose print program 41. Examples of the programs for executing the processes according to aspects of the present disclosure may include a print workflow application (Print workflow) of which the specifications have been disclosed by Microsoft Corporation.

The timing at which the auxiliary programs 42 are executed is not limited to the example illustrated in the illustrative embodiment. For instance, the auxiliary programs 42 may be executed directly by an execution instruction from the OS 21, or may be resident programs. When the auxiliary programs 42 are resident programs, the auxiliary programs 42 may perform the aforementioned operations in response to receiving execution instructions.

In any flowchart disclosed in the illustrative embodiment, a plurality of processes in any plurality of steps may be arbitrarily changed in the execution order or may be executed in parallel, to the extent that there is no inconsistency in processing results.

The processes disclosed in the illustrative embodiment may be executed by one or more CPUs, one or more hardware elements such as ASICs, or a combination of at least two elements selected from those elements (including the CPUs and the hardware elements). The processes disclosed in the illustrative embodiment may be implemented in various aspects, such as a method and a non-transitory computer-readable storage medium storing computer-readable instructions for performing the processes.

The following shows examples of associations between elements illustrated in the aforementioned illustrative embodiment(s) and modification(s), and elements claimed according to aspects of the present disclosure. For instance, the PC 1 may be an example of an "information processing device" according to aspects of the present disclosure. The controller 10 may be an example of a "controller" according to aspects of the present disclosure. The CPU 11 may be an example of a "computer" according to aspects of the present disclosure. The CPU 11 may be an example of a "processor" according to aspects of the present disclosure. The memory 12 may be an example of a "non-transitory computer-readable storage medium" according to aspects of the present disclosure. The auxiliary programs 42 may be an example of "computer-readable instructions" according to aspects of the present disclosure. The user I/F 13 may be an example of a "user interface" according to aspects of the present disclosure. The edit application 43 may be an example of an "application program" according to aspects of the present disclosure. The general-purpose print program 41 may be an example of a "general-purpose print program" according to aspects of the present disclosure. The printer 2 and the server 3 may be included in examples of an "external device" according to aspects of the present disclosure.

What is claimed is:

1. A non-transitory computer-readable storage medium storing computer-readable instructions that are executable by a computer of an information processing device and conform to a printer connected with the information processing device, the instructions realizing a support program that supports a general-purpose print program incorporated in advance in an operating system of the information processing device and configured to execute driverless printing in cooperation with the support program, the instructions of the support program being configured to, when executed by the computer, cause the information processing device to:
   when the support program receives a first execution instruction from the general-purpose print program before a print instruction is output from an application program incorporated in the information processing device to the general-purpose print program, obtain, from an external device connected with the information processing device, an image for composition that is registered in the external device, and specify the obtained image for composition as an image for composition to be used for combining with a target image to be printed;
   after specifying the image for composition, in response to the print instruction being output from the application program to the general-purpose print program, receive a second execution instruction from the general-purpose print program; and
   in response to receiving the second execution instruction, when print settings corresponding to the print instruction include a particular setting for the printer to print a composite image, cause a user interface of the information processing device to display the composite image in which the target image to be printed according to the received second execution instruction is combined with the specified image for composition obtained from the external device, before performing a printing process to cause the printer to print the composite image displayed on the user interface.

2. The non-transitory computer-readable storage medium according to claim 1,
   wherein the instructions of the support program are further configured to, when executed by the computer, cause the information processing device to:
      obtain, in the obtaining of the image for composition, a plurality of images for composition from the external device connected with the information processing device;
      receive, via the user interface, selection of an image for composition from among the obtained plurality of images for composition; and
      cause the user interface to display the composite image in which the target image to be printed according to the print instruction is combined with the selected image for composition.

3. The non-transitory computer-readable storage medium according to claim 1,
   wherein the instructions of the support program are further configured to, when executed by the computer, cause the information processing device to receive, via the user interface, editing of the image for composition while the composite image is being displayed on the user interface.

4. The non-transitory computer-readable storage medium according to claim 3,
   wherein the instructions of the support program are further configured to, when executed by the computer, cause the information processing device to, after receiving the editing of the image for composition, register the edited image for composition in the external device.

5. The non-transitory computer-readable storage medium according to claim 1,
   wherein the instructions of the support program are further configured to, when executed by the computer, cause the information processing device to:
      in response to the print instruction being output from the application program to the general-purpose print program, obtain, from the operating system, intermediate image data representing the target image to be printed according to the print instruction;
      cause the user interface to display, as the composite image, an intermediate composite image in which the image for composition is combined with the target image to be printed of the obtained intermediate image data;
      after causing the user interface to display the intermediate composite image, rasterize the intermediate composite image to generate a raster image; and
      perform the printing process to cause the printer to print the generated raster image.

6. The non-transitory computer-readable storage medium according to claim 1,
   wherein the instructions of the support program are further configured to, when executed by the computer, cause the information processing device to:
      in response to the print instruction being output from the application program to the general-purpose print program, obtain, from the operating system, intermediate image data representing the target image to be printed according to the print instruction;
      when the print instruction is set with the print setting for the printer to print the composite image, generate an intermediate composite image in which the specified image for composition is combined with the target image to be printed of the obtained intermediate image data, and rasterize the intermediate composite image to generate a raster composite image;
      cause the user interface to display the raster composite image as the composite image; and
      perform the printing process to cause the printer to print the raster composite image.

7. The non-transitory computer-readable storage medium according to claim 1,
   wherein the instructions of the support program are further configured to, when executed by the computer, cause the information processing device to perform the printing process that includes sending the composite image to the printer, thereby causing the printer to print the composite image in response to receiving the composite image.

8. The non-transitory computer-readable storage medium according to claim 7,
   wherein the instructions of the support program are further configured to, when executed by the computer, cause the information processing device to perform the printing process that includes providing the composite image to the general-purpose print program, thereby sending the composite image to the printer via the general-purpose print program and causing the printer to print the composite image in response to receiving the composite image.

9. The non-transitory computer-readable storage medium according to claim 1,
wherein the instructions of the support program are further configured to, when executed by the computer, cause the information processing device to obtain the image for composition from the printer that is the external device connected with the information processing device.

10. The non-transitory computer-readable storage medium according to claim 9,
wherein the instructions of the support program are further configured to, when executed by the computer, cause the information processing device to:
obtain function information indicating whether the printer has a sending function to send the image for composition;
when the obtained function information indicates that the printer has the sending function, obtain the image for composition from the printer; and
when the obtained function information indicates that the printer does not have the sending function, not obtain the image for composition from the printer, and in response to the print instruction with the print setting for the printer to print the composite image being output from the application program to the general-purpose print program, provide via the user interface a notification that the information processing device is unable to obtain the image for composition without displaying the composite image or performing the printing process.

11. The non-transitory computer-readable storage medium according to claim 1,
wherein the operating system is configured to, when executed by the computer, cause the information processing device to communicate with the printer using a first protocol, wherein the image for composition that is registered in the external device is obtained using a second protocol different from the first protocol.

12. An information processing device comprising:
a user interface; and
a controller including:
a processor; and
a non-transitory computer-readable storage medium storing an application program, a general-purpose print program incorporated in advance in an operating system of the information processing device, and computer-readable instructions conforming to a printer connected with the information processing device, the instructions realizing a support program that supports a general-purpose print program incorporated in advance in an operating system of the information processing device and configured to execute driverless printing in cooperation with the support program, the instructions of the support program being configured to, when executed by the processor, cause the controller to:
when the support program receives a first execution instruction from the general-purpose print program before a print instruction is output from an application program incorporated in the information processing device to the general-purpose print program, obtain, from an external device connected with the information processing device, an image for composition that is registered in the external device, and specify the obtained image for composition as an image for composition to be used for combining with a target image to be printed; and
after specifying the image for composition, in response to the print instruction being output from the application program to the general-purpose print program, receive a second execution instruction from the general-purpose print program; and
in response to receiving the second execution instruction, when print settings corresponding to the print instruction include a particular setting for the printer to print a composite image, cause the user interface to display the composite image in which the target image to be printed according to the received second execution instruction is combined with the specified image for composition obtained from the external device, before performing a printing process to cause the printer to print the composite image displayed on the user interface.

13. The information processing device according to claim 12,
wherein the operating system is configured to, when executed by the processor, cause the information processing device to communicate with the printer using a first protocol, wherein the image for composition that is registered in the external device is obtained using a second protocol different from the first protocol.

14. A method implementable by a processor executing computer-readable instructions on an information processing device, the instructions conforming to a printer connected with the information processing device and realizing a support program that supports a general-purpose print program incorporated in advance in an operating system of the information processing device and configured to execute driverless printing in cooperation with the support program, the instructions of the support program being configured to, when executed by the processor, cause the information processing device to execute the method comprising:
when the support program receives a first execution instruction from the general-purpose print program before a print instruction is output from an application program incorporated in the information processing device to the general-purpose print program, obtaining, from an external device connected with the information processing device, an image for composition that is registered in the external device, and specify the obtained image for composition as an image for composition to be used for combining with a target image to be printed;
after specifying the image for composition, in response to the print instruction being output from the application program incorporated in the information processing device to the general-purpose print program, receiving a second execution instruction from the general-purpose print program; and
in response to receiving the second execution instruction, when print settings corresponding to the print instruction include a particular setting for the printer to print a composite image, causing a user interface to display the composite image in which the target image to be printed according to the received second execution instruction is combined with the specified image for composition obtained from the external device, before performing a printing process to cause the printer to print the composite image displayed on the user interface.

15. The method according to claim 14,
wherein the operating system is configured to cause the information processing device to, when executed by the processor, communicate with the printer using a first protocol, wherein the image for composition that is registered in the external device is obtained using a second protocol different from the first protocol.

\* \* \* \* \*